United States Patent [19]

Kodera et al.

[11] Patent Number: 4,524,356
[45] Date of Patent: Jun. 18, 1985

[54] OBSTACLE DETECTING DEVICE FOR VEHICLES

[75] Inventors: Masao Kodera; Shigeyuki Akita; Yasuhisa Yoshino, all of Okazaki, Japan

[73] Assignee: Nippon Soken, Inc., Nishio, Japan

[21] Appl. No.: 401,023

[22] Filed: Jul. 22, 1982

[30] Foreign Application Priority Data

Jul. 27, 1981 [JP] Japan ............................ 56-110231[U]

[51] Int. Cl.³ .................................................. G08G 1/00
[52] U.S. Cl. .................................... 340/904; 367/105; 367/909
[58] Field of Search .................. 340/904, 52 H, 943; 307/10 R; 367/909, 123, 125, 105, 103, 138

[56] References Cited

U.S. PATENT DOCUMENTS

| | | | |
|---|---|---|---|
| 3,086,195 | 4/1963 | Halliday | 367/138 |
| 3,936,791 | 2/1976 | Kossoff | 367/138 |
| 3,950,724 | 4/1976 | Honda | 367/103 |
| 4,240,152 | 12/1980 | Duncan | 367/909 |
| 4,278,962 | 7/1981 | Lin | 340/904 |
| 4,460,987 | 7/1984 | Stokes | 367/138 |
| 4,462,092 | 7/1984 | Kawabuchi | 367/105 |
| 4,467,313 | 8/1984 | Yoshino | 340/904 |

*Primary Examiner*—James J. Groody
*Attorney, Agent, or Firm*—Cushman, Darby & Cushman

[57] ABSTRACT

An obstacle monitoring device for the rear of a vehicle comprising a plurality of ultrasonic obstacle detectors which are operated sequentially at a predetermined time interval, and an electronic monitor for supplying the obstacle detectors with their operational timing sequences at the predetermined time intervals and for determining distance information for each detector based on the changing pulse width of electric currents for each of the obstacle detectors within a particular time interval, which pulse widths correspond to the distance between an obstacle and the rear of the vehicle. A single transmission line connects the obstacle detectors with the monitor so that the number of wires in a wire-harness is reduced between the obstacle detectors (outside the vehicle) and the monitor (inside the vehicle).

5 Claims, 8 Drawing Figures

OBSTACLE DETECTING DEVICE FOR VEHICLES

BACKGROUND OF THE INVENTION

1. Field of the Invention

The present invention relates to an obstacle monitoring (or detecting) device for vehicles, especially for helping to ascertain safety in a direction rearward from the vehicle.

2. Description of the Prior Art

Figure 1:
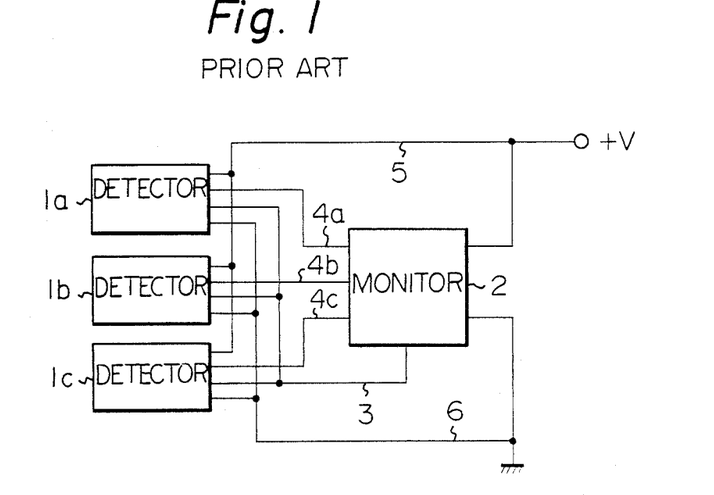
FIG. 1 shows a block circuit diagram illustrating prior art.

A prior art device will be described with reference to FIG. 1, which is one of the drawings indicated in the brief description of the drawings. A prior art device comprises a plurality of obstacle detector 1a, 1b, 1c which scan the rearward direction with ultrasonic waves or light, detect obstacles in the monitoring domain and output pulse signals, and a monitor 2 which informs the driver of the existence of the detected obstacle based on the pulse signals, as shown in FIG. 1. The obstacle detectors 1a, 1b, 1c are mounted outside of the vehicle at its back portion, while the monitor is mounted in a compartment of the automotive vehicle.

Devices having a conventional constitution, as shown in FIG. 1, however, require a trigger signal line 3 for transmitting a trigger signal from the monitor 2 to each obstacle detector 1a, 1b, 1c; detection pulse signal lines 4a, 4b, 4c for transmitting detection pulse signals from each obstacle detector 1a, 1b, 1c to the monitor 2; and power supply lines 5, 6. The result is a large number of wires in the wire-harness between the obstacle detectors and the monitor. This further results in complicated connection for the wiring work between the obstacle detectors outside the vehicle and the monitor inside the vehicle.

The present invention is proposed in order to eliminate the above-mentioned disadvantages.

SUMMARY OF THE INVENTION

An object of the present invention is to provide a rear obstacle monitoring device for vehicles, in which a plurality of obstacle detectors are operated sequentially at certain time intervals and common means constituting trigger signal line, detection pulse signal line, and power supply line is used, whereby the number of wires in the wire-harness is reduced, and connection and wiring work between the obstacle detectors outside the vehicle and the monitor inside the vehicle are simplified.

DESCRIPTION OF THE PREFERRED EMBODIMENTS

Figure 2:
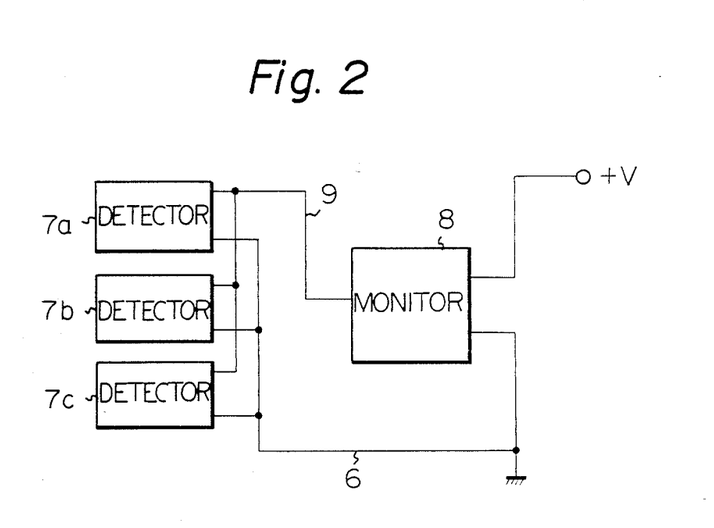
FIG. 2 shows a block circuit diagram illustrating an exemplary embodiment according to the present invention.

A exemplary device according to the present invention is shown in FIGS. 2 through 6. In FIG. 2, the device comprises obstacle detectors 7a, 7b, 7c which are operated sequentially at certain time intervals, each detecting the distance between an obstacle and the rear bumper of a vehicle by transmission and reception of ultrasonic waves, the consumed current of which increases during a time interval thereby corresponding to the distance. The device further comprises an electronic monitor 8 which is located physically apart from the obstacle detectors 7a, 7b, 7c, and supplies a trigger signal with transmission timing to the obstacle detectors 7a, 7b, 7c and determines the distance between the obstacle and the vehicle based on the detection signal from the detectors 7a, 7b, 7c. The device further comprises a ground line 6, and a transmission line 9 which performs the functions of a power supply line, a trigger signal line, and a detection pulse signal line.

Figure 3:
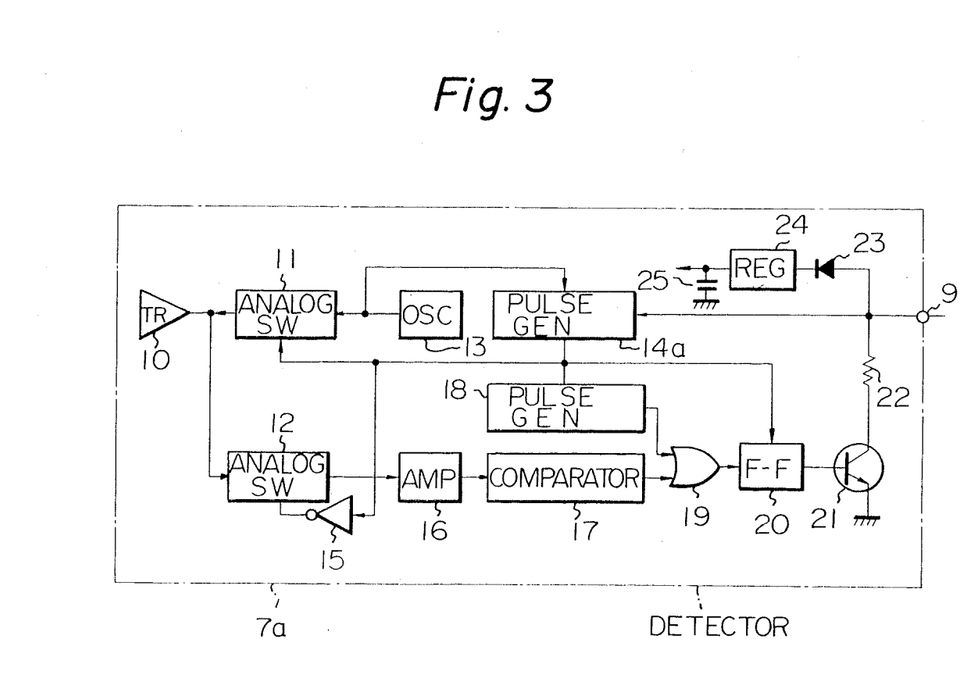
FIG. 3 shows a block circuit diagram illustrating the constitution of an obstacle detector in the device of FIG. 2.

In FIG. 3, the obstacle detector 7a includes an ultrasonic wave transmitter-receiver 10 for selectively transmitting and/or receiving ultrasonic waves, a first analog switch 11 which is connected to the ultrasonic wave transmitter-receiver 10 and is conductive during the transmitting condition of the transmitter-receiver 10, a second analog switch 12 which is connected to the ultrasonic wave transmitter-receiver 10 and is conductive during the receiving condition of the transmitter-receiver 10, a capacitance-resistance (CR) oscillator 13, an output of which is supplied to the first analog switch 11, a first pulse generating circuit 14a for receiving a trigger signal from the monitor 8 and for generating a pulse signal which rises almost simultaneously at the rising of the trigger signal and has a pulse width T of a predetermined time interval, an inverter 15 for receiving the output of the first circuit 14a and for supplying the output thereof to the second analog switch 12, and an amplifier 16 for receiving the output signal of the ultrasonic wave transmitter-receiver 10 during the receiving condition of the transmitter-receiver 10 through the second analog switch 12 and for amplifying said output signal. The obstacle detector 7a further includes a comparator 17 for comparing the output of the amplifier 16 with a predetermined value, a second pulse generating circuit 18 for generating a pulse signal which is synchronized with the output signal of the first circuit 14a and which has a pulse width of longer duration time than the time corresponding to the maximum distance of detection of the obstacle, an OR gate 19 for receiving the output of the second circuit 18 and the output of the comparator 17, a flip-flop circuit 20 for receiving the output of the OR gate 19 in the reset terminal thereof and for receiving the output of the first pulse generating circuit 14a in the set terminal thereof, a transistor 21 for receiving the output of the flip-flop circuit 20 in the base thereof, a resistor 22, one terminal of which is connected to the collector of the transistor 21 and the other terminal of which is connected to the transmission line 9, a diode 23, one terminal of which is connected to the transmission line 9, a regulator 24 which is connected to the other terminal of the diode 23 and for supplying the constant voltage output thereof to the elements of said obstacle detection means 7a as a power supply, and a smoothing capacitor 25 which is connected to the output line of the regulator 24.

The obstacle detectors 7b and 7c are constituted similarly with the obstacle detector 7a except the first pulse generator. A first pulse generator 14b of the obstacle detector 7b generates a pulse signal which rises after the lapse of a predetermined time t in relation to the rise timing of the trigger signal from the monitor 8 and which has a pulse width of time interval T. A first generator 14c of the obstacle detector 7c generates a pulse signal which rises after the lapse of a predetermined time 2t in relation to the rinse timing of the trigger signal from the monitor 8 and which has a pulse width of time interval T.

Figure 4:
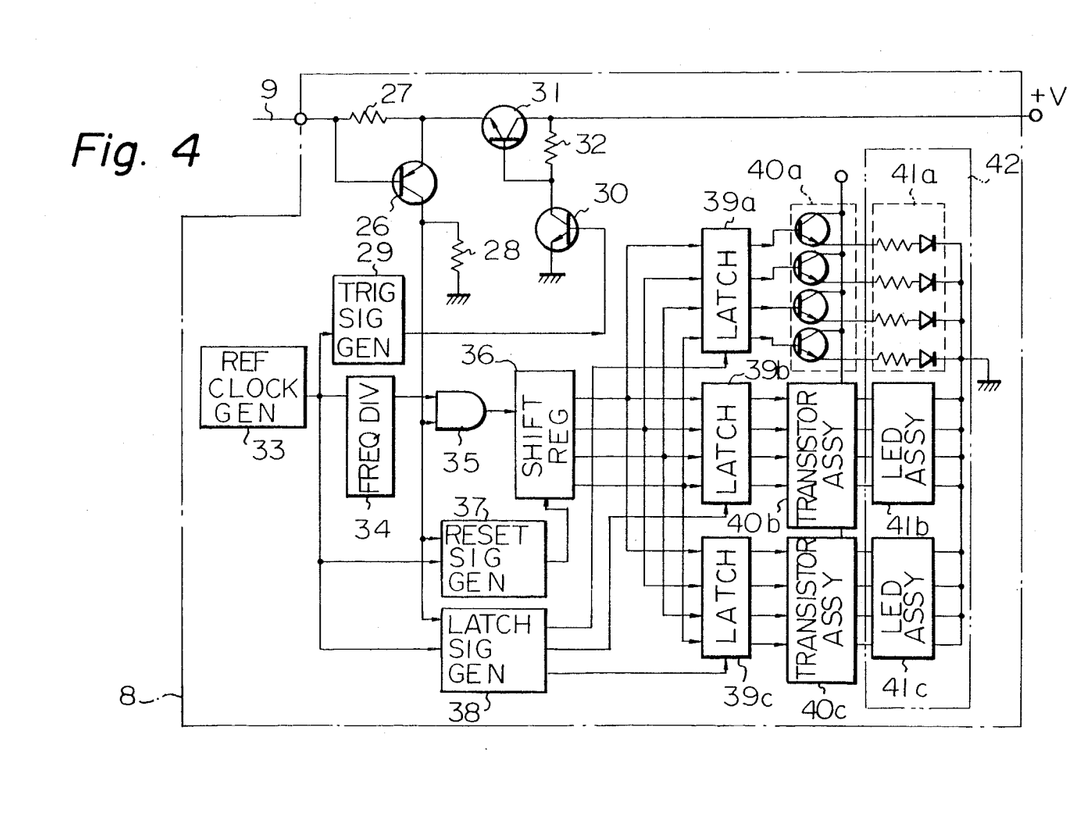
FIG. 4 shows a block circuit diagram illustrating the constitution of a monitor in the device of FIG. 2.

In FIG. 4, the monitor 8 includes a transistor 26, to the base of which said transmission line 9 is connected, a first resistor 27, which is connected between the base and the emitter of the transistor 26, a trigger signal generator 29 for generating a trigger signal, a transistor 30 for receiving the trigger signal in the base thereof, a transistor 31 for receiving an output from the collector of the first transistor 30 in the base thereof, the emitter of the transistor 31 being connected to the emitter of the transistor 26, and the collector of the transistor 31 being connected to one terminal of the power source, a resistor 32 which is connected between the collector and the base of the transistor 31, another resistor 28 through which the collector of the transistor 26 is grounded, a reference clock signal generator 33 for generating a reference clock signal and for supplying the output thereof to said trigger signal generator 29, a frequency dividing circuit 34 for receiving the output of said reference clock signal generator 33, an AND gate 35 for receiving the output of the frequency dividing circuit 34 and the output of said distance signal amplifying transistor 26, a shift register 36 for receiving the output of the AND gate 35 in the clock terminal thereof, and a reset signal generating circuit 37 for generating a reset signal synchronized with the falling edge of a pulse train signal which is outputted from the collector terminal of the distance signal amplifying transistor 26. The monitor 8 further includes a latch signal generator 38 for generating three latch signals which are synchronized with the falling edge of the pulse train signal outputted from the collector of the distance signal amplifying transistor 26 and which are successively shifted in phase, a first through third latch circuit 39a, 39b, 39c, the clock terminals of which are connected to the three output terminals of the latch signal generator 38, respectively, and the data terminals of which are connected to the output terminals of the shift register 36, first through third transistor assemblies 40a, 40b, 40c for receiving the outputs of the first through third latch circuits 39a, 39b, 39c, respectively, first through third light-emitting diode assemblies 41a, 41b, 41c which are driven by the first through third transistor assemblies 40a, 40b, 40c, respectively, and by which lighting states the driver can determine the existance of obstacles in the rear direction and the distance between the vehicle and the obstacles, and a display panel 42 provided with a distance scale thereon and arranged with the first through third diode assemblies 41a, 41b, 41c therein.

The operation of the device of the above-mentioned constitution will be explained below with reference to the waveform diagram shown in FIGS. 5A and 5B. When there are independent obstacles in the detecting domains of obstacle detectors 7a, 7c but not 7b, an output signal S(100) (FIG. 5A (1)) is first applied from the generator 29 in the monitor 8 to the base of the transistor 30. As a result, a signal having the voltage waveform S(101) (FIG. 5A (2)) is supplied to obstacle detector 7a, 7b, 7c through the transmission line 9. In the procedure, the time interval during which the signal S(101) becomes 0 volt is short. Therefore, the output voltage of the regulator 24 is maintained at approximately constant voltage by means of the regulator 24 and the smoothing capacitor 25 of each obstacle detector 7a, 7b, 7c. On the other hand, the signal S(101) is also supplied to the first pulse generator 14a, whereby the first pulse generator 14a generates a signal S(102) (FIG. 5A (3)). As a result, the first analog switch 11 becomes conductive, the ultrasonic wave transmitter-receiver 10 is driven with the CR oscillator 13, the ultrasonic wave S(103) (FIG. 5A (4)) is transmitted, the ultrasonic wave S(103) is reflected by an obstacle, a part of the reflected wave is received by the ultrasonic wave transmitter-receiver 10, and the received wave is applied to the amplifier 16 through the second analog switch 12. Then, the output signal S(104) (FIG. 5A (5)) of the amplifier 16 is compared with the predetermined value 104a through the comparator 17, and the output signal S(105) (FIG. 5A (6)) is applied to the reset terminal of the flip-flop circuit 20 through the NOR gate 19. On the other hand, the output signal S(102) of the first pulse generator 14a is applied to the set terminal of the flip-flop circuit 20. As a result, the output signal of the flip-flop circuit 20 is formed as a pulse signal S(106) (FIG. 5A (7)) having a pulse width of the time interval corresponding to the distance between the obstacle and the vehicle, the signal S(106) is supplied to the base of the transistor 21, and the transistor 21 becomes conductive when the signal S(106) is logically "1". Then, electric current flows through the resistor 27 of the monitor 8.

Figure 5A:
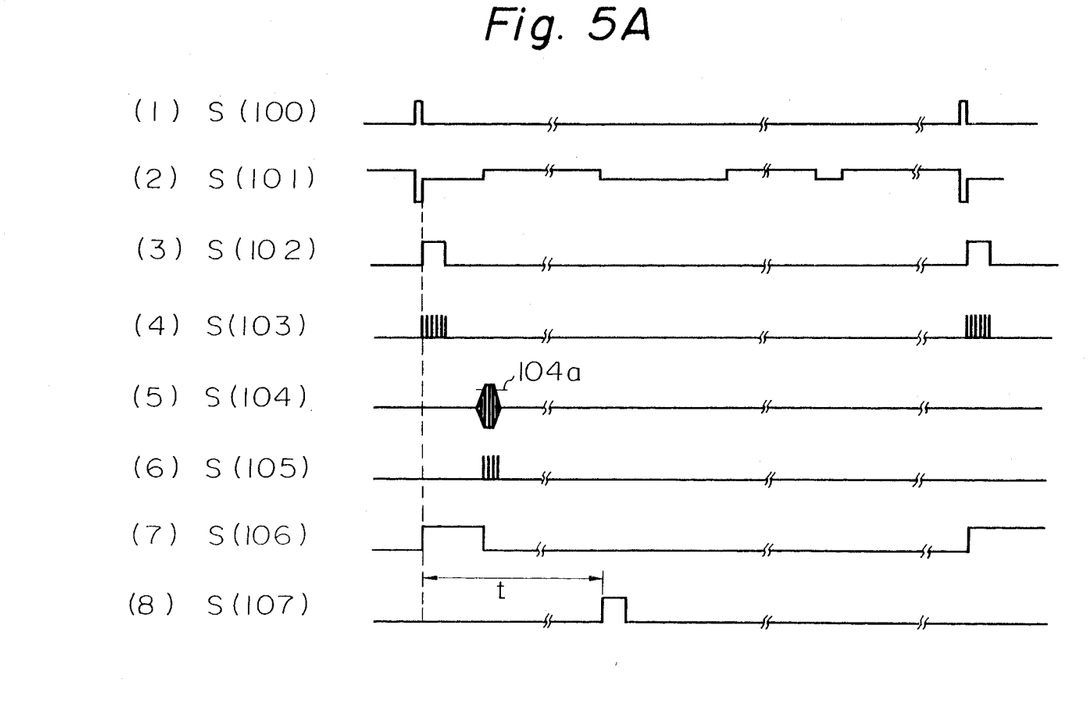
FIGS. 5A and 5B show waveform diagrams illustrating the operation of the device in FIG. 2.

In the second obstacle detector 7b, after the lapse of a predetermined time t in relation to the rise timing of the signal S(101) from the monitor 8, the pulse generator 14b generates a signal S(107) (FIG. 5A (8)). After that, the second obstacle detector 7b operates the same as the first obstacle detector 7a. However, as mentioned above, in this example there is no obstacle in the detecting domain of the second obstacle detector 7b (as opposed to first obstacle detectors 7a). Therefore, the time interval during which the electric current increases becomes longer than the time interval corresponding to the maximum detection distance by means of the second pulse generator and the NOR gate.

Further, the third obstacle detector 7c operates the same as the above-mentioned obstacle detector after the lapse of a predetermined time 2t in relation to the rise timing of the signal S(101). As a result, the distance signal S(108) (FIG. 5B (9)) is generated at the collector terminal of the transistor 26 in the monitor 8.

Figure 5B:
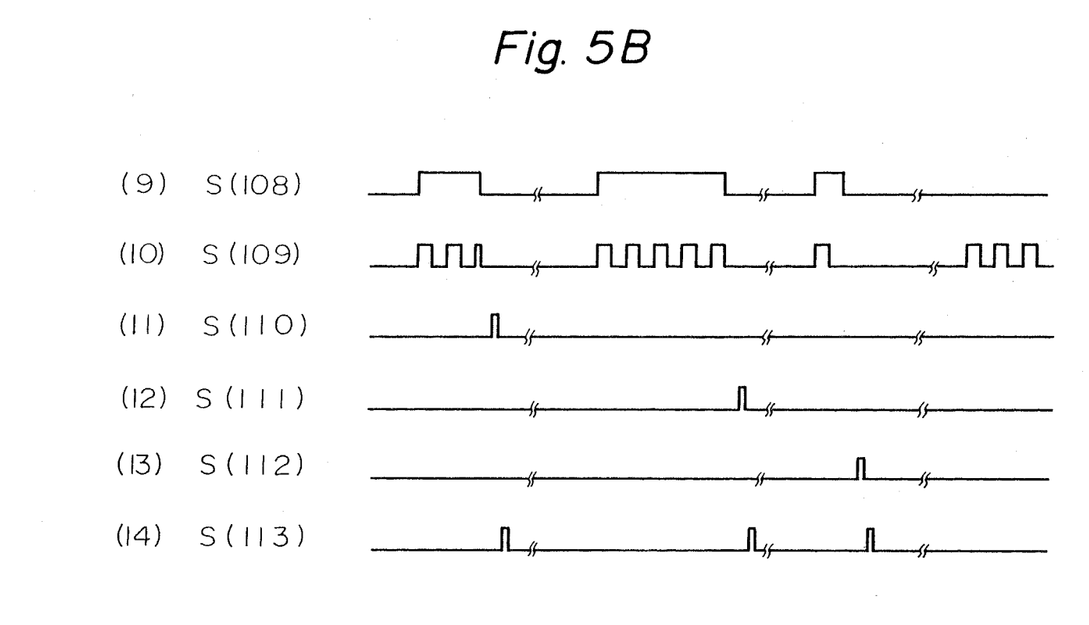
Figure 6:
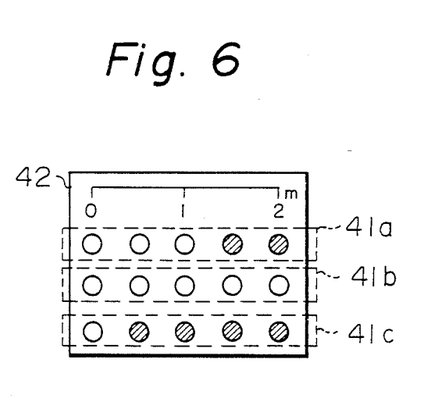
FIG. 6 shows a front view of a display panel illustrating an example of the monitor of FIG. 4.

The distance signal S(108) is supplied to one input terminal of the AND gate 35, and the distance clock signal into which the output of the clock generator 33 is frequency divided by the frequency dividing circuit, is supplied to the other input terminal of the AND gate 35. Thus, at the output of the AND gate 35, as shown in FIG. 5B (10), a pulse train signal S(109) having a pulse number proportional to the time interval during which the logical value of said distance signal is "1", is outputted and supplied to the clock terminal of the shaft register 36. On the other hand, the data terminal of the shift register 36 is connected to the power supply, therefore, when a pulse signal is applied to the clock terminal thereof, the outputs Q1, Q2, Q3, and Q4 become logically "" level sequentially. Said outputs of the shift register 36 are supplied to data terminals of the first through third latch circuits. Further, the latch signal generating circuit 38 is synchronized with the fall timing of the distance signal S(108), and the latch signals S(110) (FIG. 5B (11)), S(111) (FIG. 5B (12)), S(112) (FIG. 5B (13)) shifted in phase sequentially are applied to the latch circuits 39a, 39b, 39c. Accordingly, the output of the shift register 36 due to the first pulse train in the pulse train signal S(109) is memorized only in the latch circuit 39a. After that, the reset signal S(113) (FIG. 5B (14)) from the reset pulse generator 37 resets the shift register 36, then, the outputs of the shift register 36 due to the second and third pulse trains in the pulse train signal S(109) are memorized only in the latch circuit 39b and 39c, respectively. Since the inverted outputs of the latch circuits 39a, 39b, 39c are connected to the bases of the transistor in the transistor assemblies 40a, 40b, 40c, respectively, the diode assemblies 41a, 41b, 41c are lighted as shown in FIG. 6 and display to the driver the existence or nonexistence of the rear obstacle and the distance between the rear obstacle and the vehicle.

Figure 7:
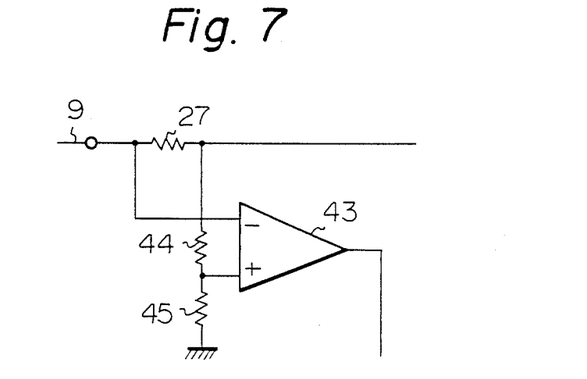
FIG. 7 shows a partial circuit diagram illustrating another example of the monitor in the device of FIG. 2.

Another example of the constitution of the monitor is shown in FIG. 7 as a partial circuit diagram. In FIG. 7, instead of the transistor 26 and the resistor 28, an operational amplifier 43 and resistors 44 and 45 are used. The inverting input terminal of the operational amplifier 43 is connected to the transmission line 9, the noninverting input terminal of the operational amplifier 43 is connected to a terminal of the first resistor 27 through the resistor 44, and also the noninverting input terminal is grounded through the resistor 45. By the monitor using the above-mentioned circuit, the same effect in the case using the circuit of the example in FIG. 4 can be obtained.

We claim:

1. A vehicular device for detecting obstacles, comprising:

a plurality of detection means, responsive to trigger signals, for transmitting respective signal waves, for receiving said signal waves as reflected by said obstacles and for producing respective output signals corresponding to respective distances of said detection means to said obstacles, each said obstacle detection means including a timing means for receiving said trigger signals and for enabling said signal wave transmission sequentially so as to produce said output signals sequentially;

monitor means, physically separated from said detection means, for monitoring said output signals, said monitor means including trigger signal generating means for generating said trigger signals, output signal receiving means for receiving said output signals and display means, having a plurality of display areas respectively corresponding to said plurality of obstacle detection means, for displaying respective distances from said obstacles to said respective detection means on their corresponding display areas in response to said output signals; and a single transmission line which connects said plurality of detection means with said monitor means to permit transmission of said trigger signal from said trigger signal generating means to said timing means, and to permit transmission of said output signals from said detection means to said output signal receiving means by superimposing said trigger signal and said output signals on an electric voltage imposed by said monitor means on said transmission line.

2. A device as in claim 1 wherein said detection means are adapted to be mounted on the outside of said vehicle on a rear portion thereof such that said device detects obstacles which are rearward of said vehicle; and said monitor means are adapted to be mounted within said vehicle such that said display means are veiwable by passengers within said vehicle.

3. A device as in claim 1 wherein said timing means comprises a first pulse generating circuit for receiving said trigger signals and for generating first pulse signals which rise at respective timings in response to the rising of said trigger signal and which pulse signals have a pulse width of a predetermined duration; and wherein said detection means further each comprise:

an ultrasonic wave transmitter-receiver for selectively transmitting and receiving ultrasonic waves, a first analog switch connected to said ultrasonic wave transmitter-receiver for being conductive in response to said first pulse signals during transmission of said ultrasonic waves;

a second analog switch connected to said ultrasonic wave transmitter-receiver for being conductive during reception of said ultrasonic waves, an oscillator for supplying its output to said first analog switch, an inverter for receiving said first pulse signals, and for supplying its output to said second analog switch so as to control the conductivity of said second analog switch complimentary to the conductivity of said first analog switch, an amplifier for receiving and amplifying from the second analog switch the output signal of said ultrasonic wave transmitter-receiver during the reception of said ultrasonic waves, a comparator for comparing the output of said amplifier with a predetermined value, a second pulse generating circuit for generating second pulse signals which are synchronized with the first pulse signals of said first pulse generating circuit, said second pulse signals having a pulse width of longer time duration than a time corresponding to the maximum detectable distance to an obstacle, an OR gate for receiving the output of said second pulse generating circuit and the output of said comparator, a flip-flop circuit for receiving the output of said OR gate in the reset terminal thereof and for receiving the output of said first pulse generating circuit in the set terminal thereof, a transistor for receiving the output of said flip-flop circuit in the base thereof, a resistor having one terminal connected to the collector of said transistor and the other terminal connected to said transmission line, a diode having one terminal connected to said transmission line, a regulator, connected to the other terminal of said diode, for supplying a constant voltage output to the elements of said power detection means, and a smoothing capacitor in series connection with the output line of said regulator.

4. A device as in claim 6, wherein said output signal receiving means comprises:

an amplifying transistor connected to said transmission line, and a first resistor connected between the base and emitter of said amplifying transistor, and wherein said trigger signal generating means comprises:

a trigger signal generator for generating said trigger signal, a first transistor for receiving said trigger signal, a second transistor for receiving the output of said first transistor in the base thereof, the emitter of said second transistor being connected to the emitter of said amplifying transistor, and the collector of said second transistor being connected to one terminal of a power source, and a clock generator for outputting a reference clock signal to said trigger signal generator; and wherein said plurality of display areas comprise a plurality of light-emitting diode assemblies;

said display means comprises a display panel; and said monitor means further comprises:

a second resistor connected between the collector and the base of said second transistor, a frequency dividing circuit for receiving the output of said clock generator, an AND gate for receiving the output of said frequency dividing circuit and the output of said amplifying transistor, a shift register for receiving the output of said AND gate in the clock terminal thereof, reset signal generating circuit means for generating a reset signal synchronized with the falling edge of a pulse train signal output from the collector terminal of said amplifying transistor, latch signal generator means for generating a plurality of latch signals synchronized with said falling edge of the pulse train signal and which are successively phase-shifted, a plurality of latch circuits, the clock terminals of which are connected to a plurality of output terminals of said latch signal generator, respectively, and the data terminals of which are connected to the output terminals of said shift register, and a plurality of transistor assemblies for receiving the outputs of said plurality of latch circuits, respectively; wherein said plurality of light-emitting diode assemblies are driven by said plurality of transistor assemblies, respectively, to thereby indicate the existance of said distance to obstacles in the respective domains of the plurality of detection means; and said display panel has a distance scale thereon and is arranged with said plurality of light-emitting diode assemblies therein.

5. A device as in claim 1, wherein said output signal receiving means comprises:

a first resistor connected to said transmission line, and an operational amplifier, to the inverting input terminal of which said transmission line is connected and to the non-inverting input terminal of which said first resistor is connected through a resistor divide network; and wherein said trigger signal generating means comprises:

a trigger signal generator for generating said trigger signal, a first transistor for receiving said trigger signal, a second transistor for receiving the output of said first transistor in the base thereof, the emitter of said second transistor being connected to said first resistor and the collector of said second transistor being connected to one terminal of a power source, and a clock generator for outputting a reference clock signal to said trigger signal generator; and wherein said plurality of display areas comprise a plurality of light-emitting diode assemblies;

said display means comprises a display panel; and said monitor means further comprises:

a second resistor connected between the collector and base of said second transistor, a frequency dividing circuit for receiving the output of said clock generator, an AND gate for receiving the output of said frequency dividing circuit and the output of said operational amplifier, a shift register for receiving the output of said AND gate in the clock terminal thereof, reset signal generating circuit means for generating a reset signal sychronized with the falling edge of a pulse train signal output from said operational amplifier, a latch signal generator means for generating a plurality of latch signals synchronized with said falling edge of the pulse train signal and which are successively phase-shifted, a plurality of latch circuits, the clock terminals of which are connected to a plurality of output terminals of said latch signal generator, respectively, and the data terminals of which are connected to the output terminals of said shift register, and a plurality of transistor assemblies for receiving the outputs of said plurality of latch circuits, respectively; wherein said plurality of light-emitting diode assemblies are driven by said plurality of transistor assemblies, respectively, to thereby indicate the existence of said distance to obstacles in the respective domains of the plurality of detection means; and said display panel has a distance scale thereon and is arranged with said plurality of light-emitting diode assemblies therein.

* * * * *

UNITED STATES PATENT AND TRADEMARK OFFICE
CERTIFICATE OF CORRECTION

PATENT NO. : 4,524,356
DATED : June 18, 1985
INVENTOR(S) : KODERA et al

It is certified that error appears in the above-identified patent and that said Letters Patent is hereby corrected as shown below:

Column 6, line 65, should read:

--4. A device as in claim 1, wherein said output signal--

Signed and Sealed this

Twenty-first Day of January 1986

[SEAL]

Attest:

DONALD J. QUIGG

Attesting Officer

Commissioner of Patents and Trademarks